N. PAVIA & G. CASALIS.
AUTOMATIC COUPLING DEVICE FOR RAILWAY CARRIAGES.
APPLICATION FILED JULY 1, 1908.

1,031,663.

Patented July 2, 1912.

7 SHEETS—SHEET 1.

Witnesses
J. S. Barker
Geo. B. Pitts

Inventors
Nicola Pavia
Giacomo Casalis
by H. N. Low attorney

N. PAVIA & G. CASALIS.
AUTOMATIC COUPLING DEVICE FOR RAILWAY CARRIAGES.
APPLICATION FILED JULY 1, 1908.

1,031,663.

Patented July 2, 1912.

7 SHEETS—SHEET 2.

N. PAVIA & G. CASALIS.
AUTOMATIC COUPLING DEVICE FOR RAILWAY CARRIAGES.
APPLICATION FILED JULY 1, 1908.

1,031,663.

Patented July 2, 1912.
7 SHEETS—SHEET 3.

N. PAVIA & G. CASALIS.
AUTOMATIC COUPLING DEVICE FOR RAILWAY CARRIAGES.
APPLICATION FILED JULY 1, 1908.

1,031,663.

Patented July 2, 1912.

7 SHEETS—SHEET 4.

N. PAVIA & G. CASALIS.
AUTOMATIC COUPLING DEVICE FOR RAILWAY CARRIAGES.
APPLICATION FILED JULY 1, 1908.
1,031,663.
Patented July 2, 1912.
7 SHEETS—SHEET 5.
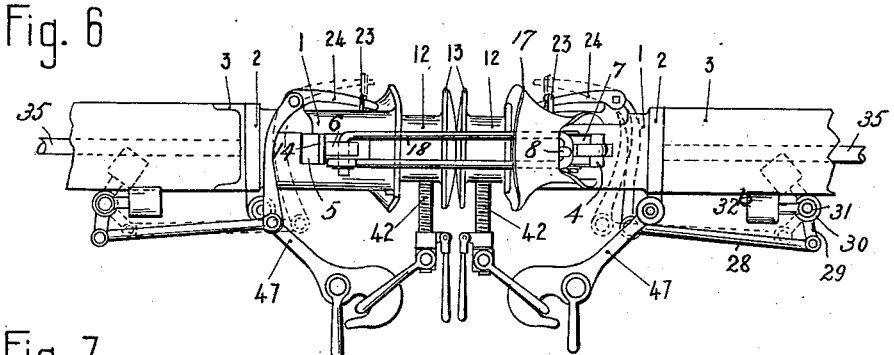
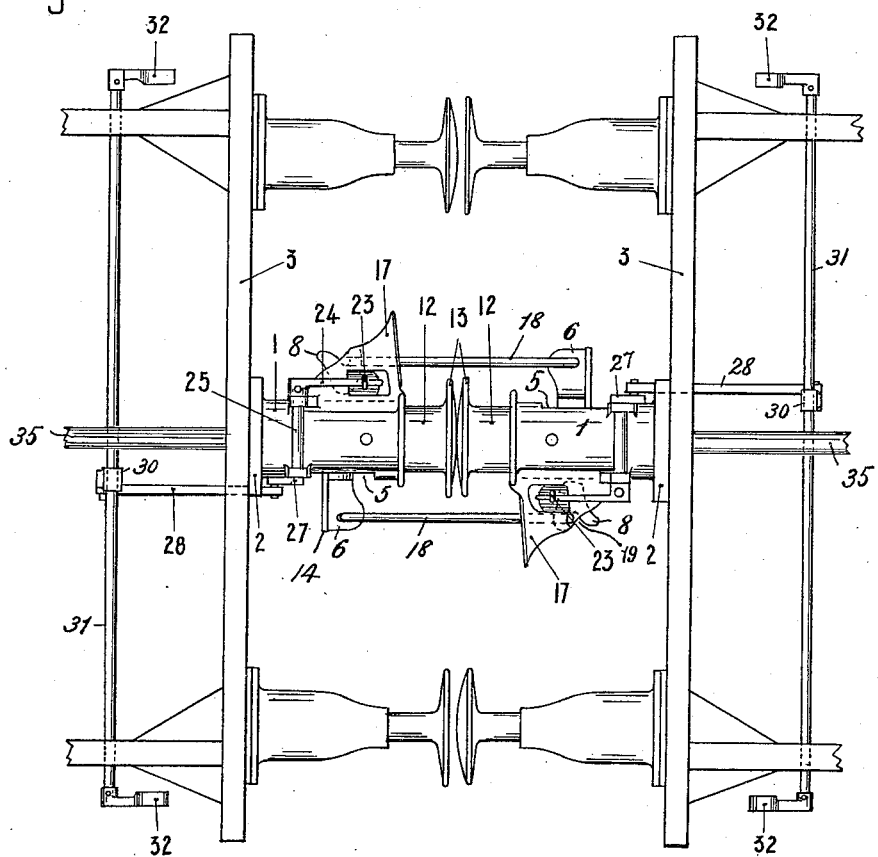

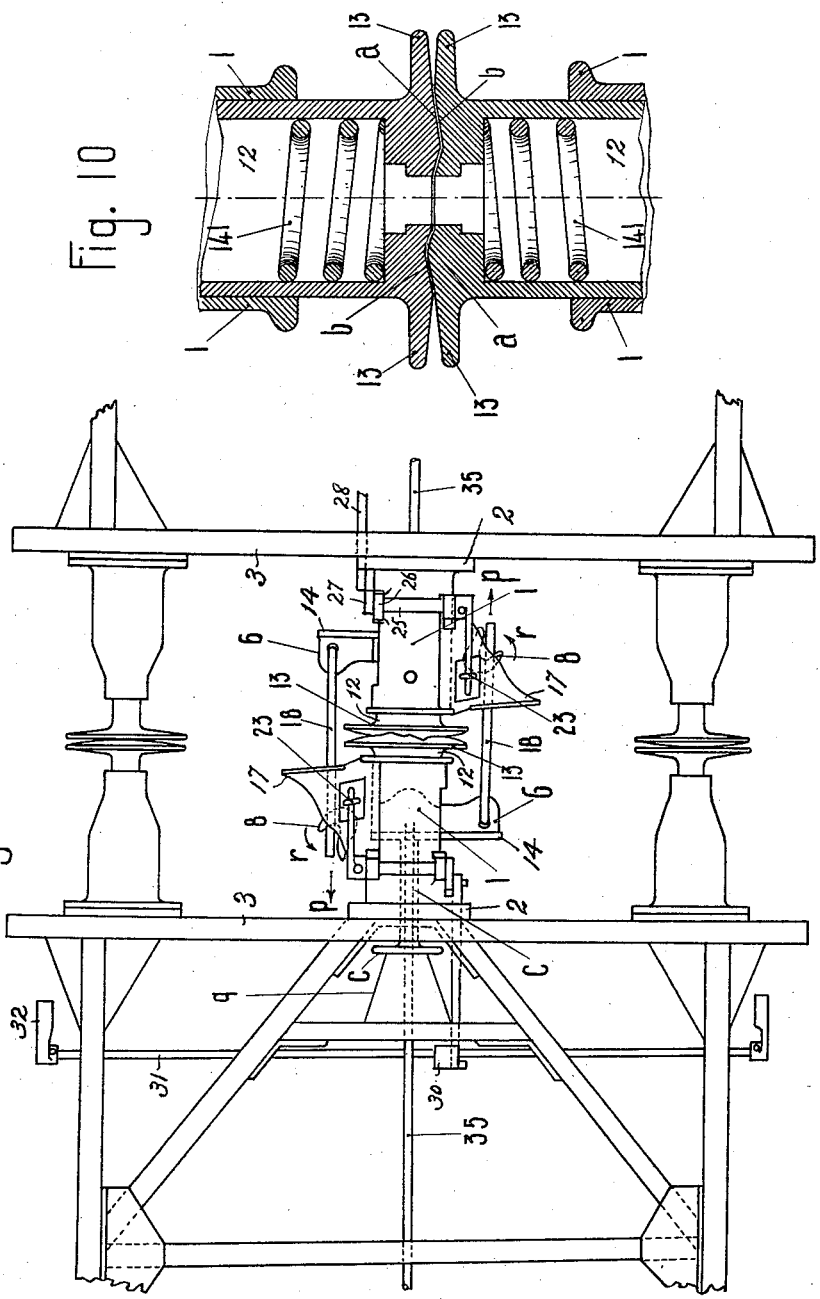

N. PAVIA & G. CASALIS.
AUTOMATIC COUPLING DEVICE FOR RAILWAY CARRIAGES.
APPLICATION FILED JULY 1, 1908.
1,031,663.
Patented July 2, 1912.
7 SHEETS—SHEET 7.
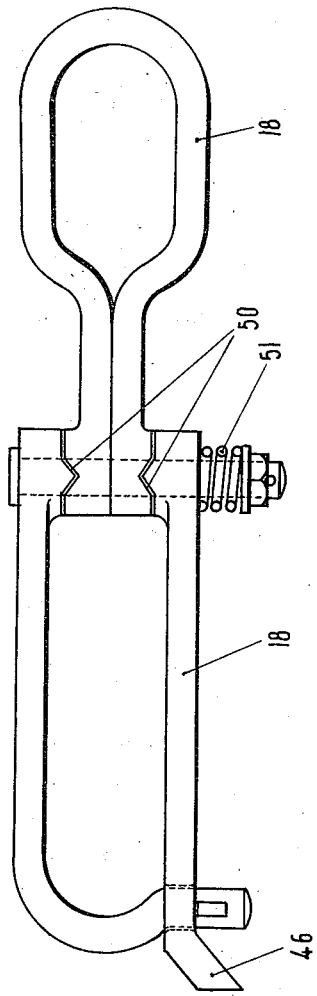
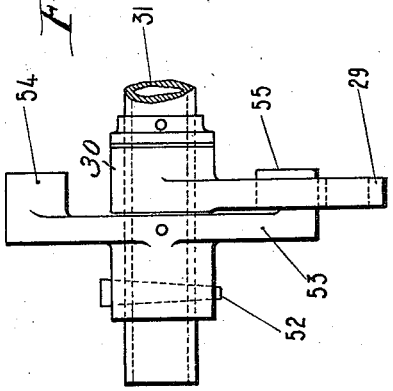
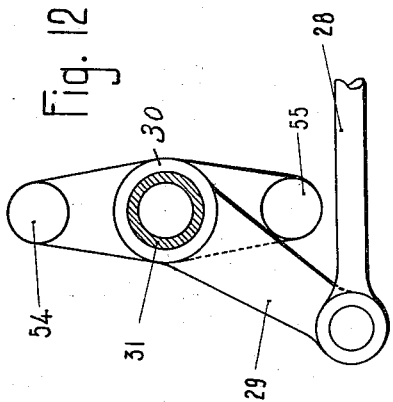

UNITED STATES PATENT OFFICE.

NICOLA PAVIA AND GIACOMO CASALIS, OF TURIN, ITALY.

AUTOMATIC COUPLING DEVICE FOR RAILWAY-CARRIAGES.

1,031,663.	Specification of Letters Patent.	Patented July 2, 1912.

Application filed July 1, 1908. Serial No. 441,505.

*To all whom it may concern:*

Be it known that we, NICOLA PAVIA, engineer, and GIACOMO CASALIS, railway employee, of Turin, Italy, have invented certain new and useful Improvements in Automatic Coupling Devices for Railway-Carriages, of which the following is a full, clear, and exact specification.

The invention relates to a coupling device for railway carriages, which is so formed that it is possible at pleasure to obtain the coupling or the uncoupling of the carriages by means of a handle or counterweight situated outside of the rails and laterally in regard to the carriage.

According to the invention, suitable means are provided in order to obtain the possibility of coupling together a carriage of old construction with a new one, that is with a carriage provided with the new coupling device.

The drawings herewith illustrate the invention.

Figure 1:
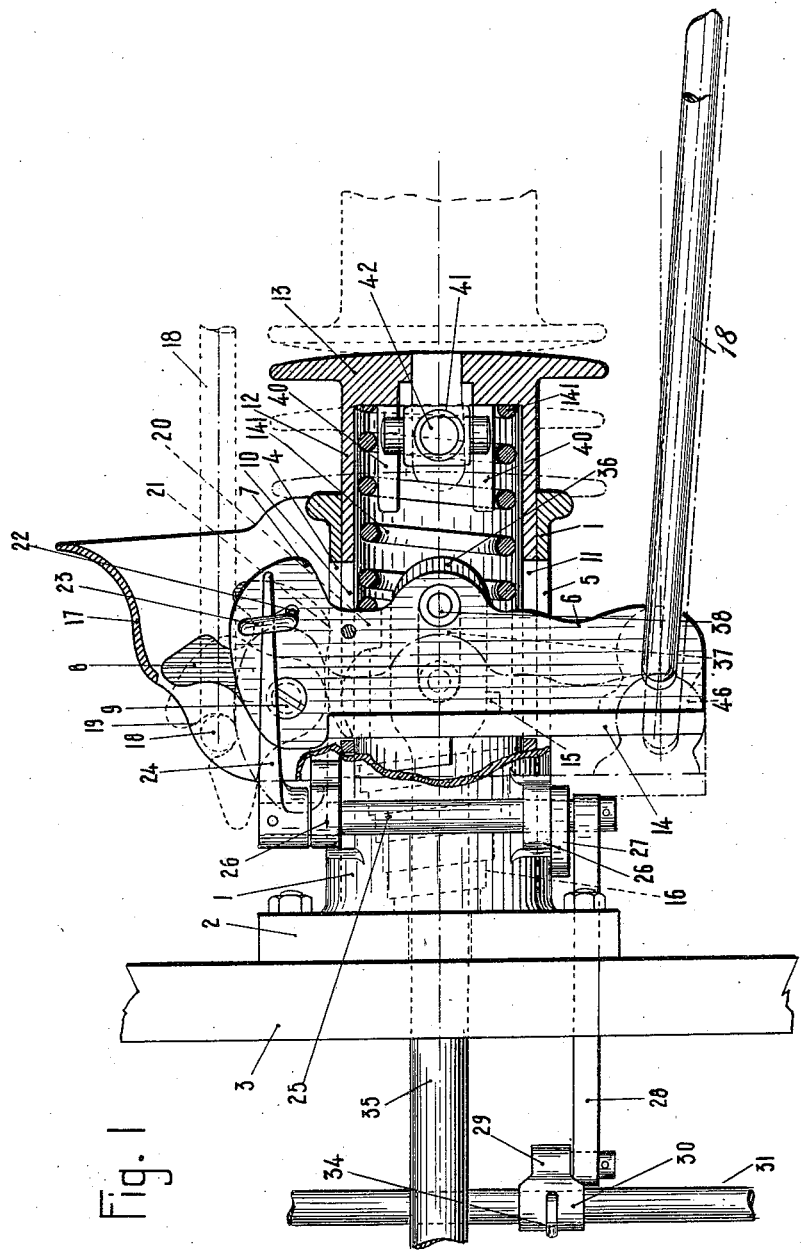
Figure 2:
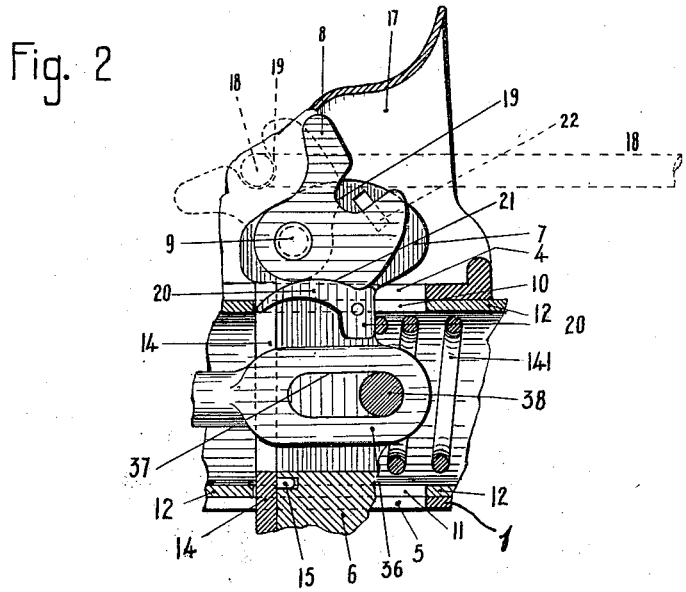
Figure 3:
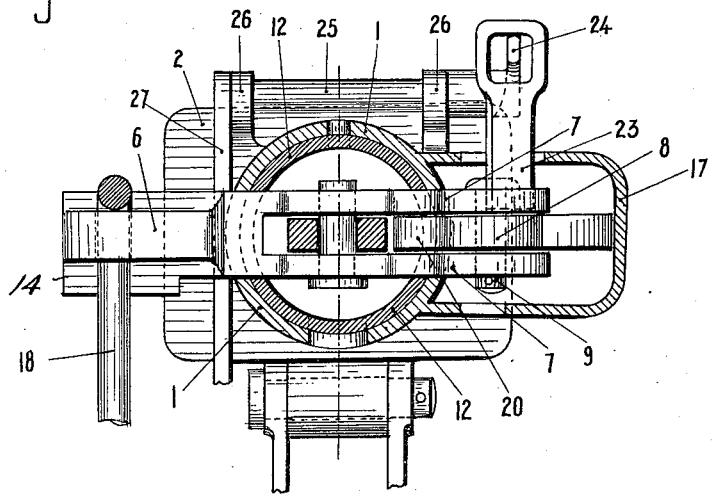
Figure 4:
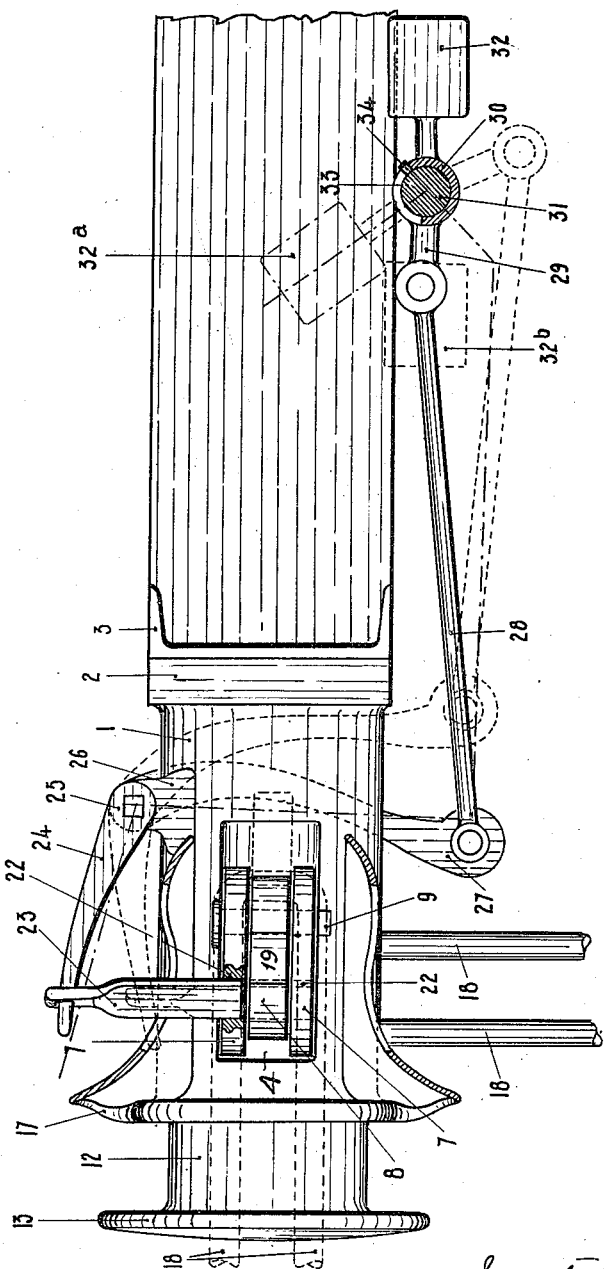
Figure 8:
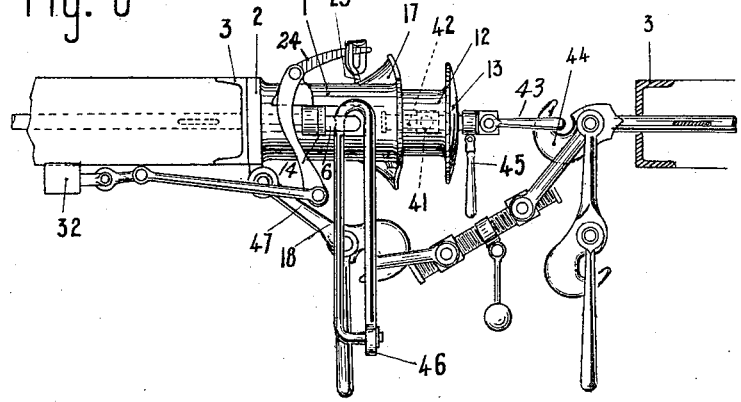
Figure 5:
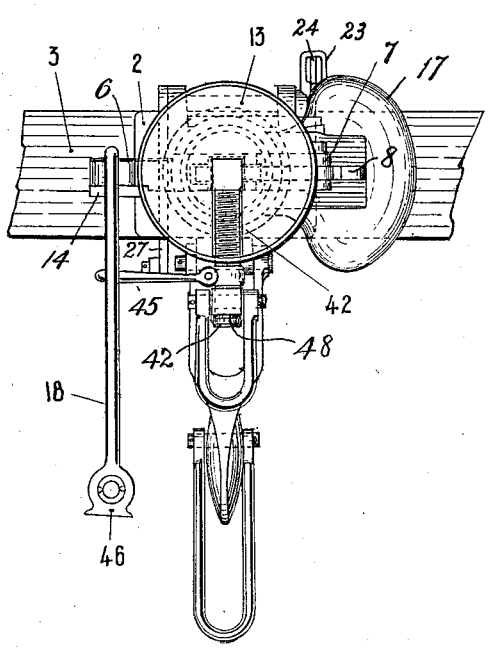

Figure 1 is a horizontal section of the coupling device; Fig. 2 is a portion of the device in section; Fig. 3 is a vertical section; Fig. 4 is a side elevation; Fig. 5 is a front view of the device; Figs. 6 and 7 give in side elevation and plan, respectively, the ends of two carriages which are coupled together by means of the new coupling device. Fig. 8 illustrates two carriages provided with the mixed coupling device, that is with the old and the new system. Fig. 9 gives a plan view of the ends of two carriages provided with the coupling device; Fig. 10 is a section through the buffer-boxes; Fig. 11 is a side view of a modified form of coupling link; Fig. 12 is a side view of a modified means for connecting the cross shaft with the sleeve. Fig. 13 is a top view of the same.

Like characters of reference indicate corresponding parts throughout the figures of the drawings.

1 is a cylindrical box open at one end, the other end being attached to the frame 3 of the carriage by means of a flange 2. This box is formed with two lateral and horizontal openings 4, 5 through which passes a bar or lever 6, 7. Its part 6 is a simple plate and the part 7 is forked to contain a hook 8 pivoted on a journal or screw 9 fixed in the part 7.

12 is a cylindrical box arranged to slide within the box 1 and having slots 10, 11 in line with the openings 4, 5.

In Fig. 10 the exterior end of the box 12 has the form and function of a buffer head 13, the end face of the head having the shape shown at $a$, $b$.

141 is a spring acting outward against the buffer head and inward against the bar or lever 6, 7 to press the latter toward the inner ends of the slots 10, 11.

14 is a plate arranged in the said slots behind the bar 6, 7 and connected with the latter by a pin 15 (Fig. 2) which enters and frictionally engages a recess in the bar.

16 is a spring resting against the flange 2 and pressing outwardly on the plate 14 and consequently acting in the same direction on the bar 6, 7 and spring 141.

17 is a funnel-shaped mouthpiece attached to the box 1 at its side and partially inclosing the hook 8. The opposing coupler has a link 18 attached to its bar 6, 7 and adapted to enter the mouthpiece 17 in the direction of the arrow $p$, Fig. 9, press back the hook 8 in the direction of the arrow $r$, and be received in the recess 19 of the latter.

20 is a pawl pivoted in the part 7 and formed with a surface 21 corresponding with the outer face of the hook 8. It is shaped to be engaged by the spring 141 and tends to keep the hook in position (shown in full lines in Fig. 1) for coupling. The forks of the parts 7 are provided with slots 22 through which passes a bolt 23, said bolt being slidable up and down in said slots. This bolt is engaged by a lever 24 fixed on a shaft 25 held in bearings 26 on the box 1.

27 is an arm fixed on the shaft 25 and having pivoted to it a link 28. The inner end of this link is pivoted to the arm 29 of a sleeve 30 mounted to rotate in an arc a little less than a half circle on the cross shaft 31. This cross shaft is acted on by an eccentric weight or weights 32 (Fig. 4). The sleeve 30 is formed with a slot of a little less than 180 degrees in which is situated a stud 34 fixed on the cross shaft.

When the parts are in the position shown in full lines in Fig. 4 the bolt 23 is in its lifted position out of engagement with the hook 8. When the weight is brought to the position shown at 32ª the arm 24 and bolt 23 are carried downward. In this latter case the bolt 23 does not fall if the parts are as shown in full lines in Fig. 1 with the bolt resting on the top face of the hook 8, but when the hook has been forced back as shown in dotted lines the bolt will then pass downward in its slot 22 outside of the hook and lock the latter in coupling position. Thereupon the weight falls to the position shown at 32ᵇ.

In order to permit the uncoupling of the carriages it is sufficient to turn the shaft 31 to bring the weight to its position 32ª described.

The parts are so proportioned that on coupling the spring 141 is compressed and thereafter acts to hold the link 18 pressing outwardly in the hook 8 during traction, to prevent possible looseness which might damage the coupling device.

The described device operates not only as an automatic coupling means for railway carriages, but also as a buffer. Its action is different from the action of ordinary buffers. It acts not only on the carriage frame but also acts directly on the draft bar. The latter is shown at 35, passing outwardly from a suitable attachment to the frame 3. Such attachment may be by springs in a known manner. Its outer end enters the box 12 and is formed with a head and eye 36 the aperture of which latter is in the form of a longitudinal slot 37 through which passes a bolt 38 fixed in the bar 6, 7.

During traction one of the carriages draws the other by the links 18, acting on the hooks 8, bars 6, 7, bolts 38 and draft bars 35. It is to be understood that each coupling device has a hook and a link, as shown, so that in operation two links are ordinarily in action.

During coupling the box 12 slides within the box 1 and presses against the spring 141 till the front ends of the slots 10, 11 reach the bar 6, 7. Thereupon the bar is pressed against the spring 16, and when the latter is compressed the draft bar is acted on and forced inward.

According to the present invention, means are provided in order to obtain the possibility of the coupling of a carriage provided with the new coupling device with a carriage constructed in the old manner. For this purpose the box 12 is provided inside with the guides 40, between which slides a nut 41. Into this nut a threaded draft bar 42 of an ordinary coupler may be screwed by the aid of the handle 45 (Fig. 8). This draft bar 42 may hang through a slot of the box 12 (Fig. 5). If an old carriage has to be coupled with a new one, the draft bar 42 must be connected in the usual way with the hook 44 of the old carriage. (Fig. 8). The link 43 of the bar 42 is swiveled to the bar at 48, so that the threaded bar 42 may be screwed into the nut 41 the desired distance after the link 43 has been connected with the hook 44. In this case the link 18 is got out of the way by sliding it back in the part 6 till it hangs free (Figs. 5 and 8). This link has a foot or flange 46 which acts to support it in horizontal position for coupling. This flange 46 then rests under the part 6 and its rear side is pressed forward by the plate 14, whereby it is held horizontal.

47 is a reserve hook for use when the automatic coupling device accidentally breaks.

The link 18 may be constructed with its outer part pivoted to its inner part (Fig. 11) so that the outer part may be turned laterally out of the way. The two limbs of the inner part are pressed together by a spring 51 and their inner faces are formed with inclined projections, and the outer faces of the outer link-part are formed with corresponding inclined recesses, as shown at 50, whereby the outer link-part will be held in coupling position, and yet by a yielding of the spring 51 the outer link-part may be turned laterally as described.

In Figs. 12 and 13 is shown a substitute for the stud 34 and its slot, the same consisting of a cross arm 53 secured on the shaft 31 by a key 52, and having studs 54, 55 arranged to engage alternately the sides of the arm 29 of the sleeve 30.

C, C, q are parts, attached to the frame 3, which may be employed to inclose and guide the draft bar 35.

What we claim is—

1. In an automatic coupling device for railway carriages, the combination of a buffer, means for connecting the same slidably with the carriage frame, the draft bar, a transverse bar connected with the draft bar and slidably engaged by the buffer, a spring interposed between the buffer and the transverse bar, a link and a hook attached respectively to the two ends of the transverse bar, and means for locking the hook in locking position.

2. In an automatic coupling device for railway carriages, the combination of a transverse bar provided at one end with a hook and at the other end with a link, springs acting longitudinally on the lever at a point between the hook and link, means for confining the springs, a lock for holding the hook in its link-engaging position, and a draft bar connected with the middle portion of the lever, substantially as set forth.

3. The combination of a transverse bar provided at one end with a hook and at the other end with a link, a buffer head slidable relative to the bar, a spring interposed between the buffer head and the said bar, a draft bar connected with the lever, and means for locking the hook, substantially as set forth.

In witness whereof, we have hereunto signed our names in the presence of two subscribing witnesses.

NICOLA PAVIA.
GIACOMO CASALIS.

Witnesses:
JULIUS BEAZETTA,
LOUIS ALLAN.

Copies of this patent may be obtained for five cents each, by addressing the "Commissioner of Patents, Washington, D. C."